(12) United States Patent
Gunda

(10) Patent No.: US 7,921,324 B2
(45) Date of Patent: Apr. 5, 2011

(54) PROVIDING FILE SYSTEM AVAILABILITY DURING LOCAL PATH FAILURE OF A NON-SERVER NODE

(75) Inventor: Kalyan C. Gunda, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 11/776,581

(22) Filed: Jul. 12, 2007

(65) Prior Publication Data

US 2009/0019052 A1   Jan. 15, 2009

(51) Int. Cl.
    G06F 11/00 (2006.01)
(52) U.S. Cl. .................. 714/4; 714/43; 370/217
(58) Field of Classification Search .................. 714/4, 5, 714/43; 370/217, 221, 216, 225, 228
See application file for complete search history.

(56) References Cited

U.S. PATENT DOCUMENTS

| | | | |
|---|---|---|---|
| 5,566,297 A | 10/1996 | Devarakonda et al. | |
| 6,367,029 B1 | 4/2002 | Mayhead et al. | |
| 6,708,175 B2 | 3/2004 | Curran et al. | |
| 6,862,263 B1 * | 3/2005 | Simmons | 370/217 |
| 6,915,391 B2 | 7/2005 | Wang-Knop et al. | |
| 7,093,155 B2 * | 8/2006 | Aoki | 714/4 |
| 7,218,606 B2 * | 5/2007 | Soumiya | 370/217 |
| 7,320,084 B2 * | 1/2008 | Steinmetz et al. | 714/4 |
| 7,619,965 B2 * | 11/2009 | Kobayashi et al. | 370/217 |
| 2002/0073354 A1 | 6/2002 | Schroiff et al. | |
| 2002/0188590 A1 | 12/2002 | Curran et al. | |
| 2004/0158764 A1 | 8/2004 | Sonoda et al. | |

* cited by examiner

*Primary Examiner* — Philip Guyton
(74) *Attorney, Agent, or Firm* — Cantor Colburn LLP; Steven Chiu

(57) ABSTRACT

File system availability during local path failure of a non-server node is provided by generating a server database of one or more server nodes having access to a storage device of the file system. The storage device is accessed by a non-server node over a local path to implement one or more input/output (I/O) operations. Upon failure of an I/O operation over the local path, the server database is queried to identify one or more server nodes having access to the storage device. One or more subsequent I/O operations for the storage device are implemented using the one or more identified server nodes. After a restoration of the local path is detected, I/O operations for the storage device are then implemented over the local path.

12 Claims, 2 Drawing Sheets

PROVIDING FILE SYSTEM AVAILABILITY DURING LOCAL PATH FAILURE OF A NON-SERVER NODE

TRADEMARKS

IBM® is a registered trademark of International Business Machines Corporation, Armonlk, N.Y., U.S.A. Other names used herein may be registered trademarks, trademarks or product names of International Business Machines Corporation or other companies.

BACKGROUND OF THE INVENTION

1. Field of the Invention

This invention relates to the field of computer systems management and, in particular, to methods, systems, and computer program products for providing file system availability during local path failure of a non-server node.

2. Description of Background

Large computing systems typically include a plurality of processor nodes and disk drives. A subset of these nodes are designated to act as server nodes. The remaining nodes, designated as non-server nodes, may perform input/output (I/O) operations on a disk drive through a server node or over a local path. From time to time, an adapter, cable, switch, or other hardware element may fail while a non-server node is accessing the disk drive through a local path. This failure may cause one or more I/O operations to fail, ultimately resulting in file system unmount due to lost access to the disk drive. Mounting refers to the process of malting a group of files in a file system structure available to a user by making a data storage drive physically accessible, logically accessible, or both. The file system structure defines the manner in which files are named, as well as the locations in which these files are logically placed for storage and retrieval. In the event of a file system unmount, a user may be deprived of access to important data. Accordingly, what is needed is an improved technique for providing file system availability in the event of a local path failure.

SUMMARY OF THE INVENTION

The shortcomings of the prior art are overcome and additional advantages are provided by generating a server database of one or more server nodes having access to a storage device of a file system. The storage device is accessed by a non-server node over a local path to implement one or more input/output (I/O) operations. Upon failure of an I/O operation over the local path, the server database is queried to identify one or more server nodes having access to the storage device. One or more subsequent I/O operations for the storage device are implemented using the one or more identified server nodes. After a restoration of the local path is detected, I/O operations for the storage device are then implemented over the local path.

Technical Effects

When a non-server node is accessing a storage device through a local path and an adapter, cable, switch, or other hardware element fails, file system availability is preserved by accessing the storage device through a server node.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
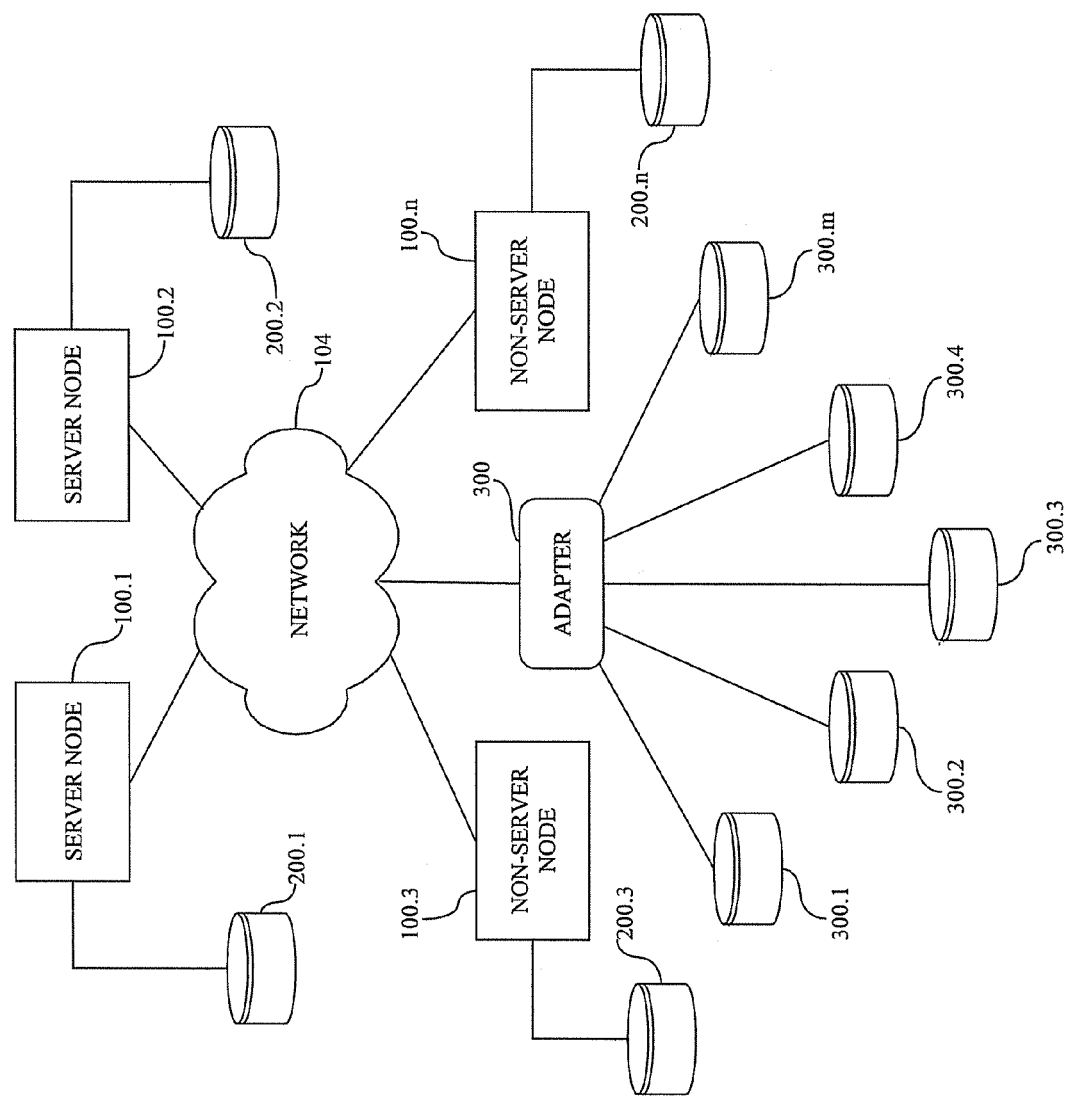
FIG. 1 is a block diagram setting forth an illustrative operational environment in which the present invention is employed.

FIG. 1 is a block diagram setting forth an illustrative operational environment in which the present invention is employed. In particular, a plurality of nodes are interconnected over a network 104. A subset of these nodes are designated to act as server nodes 100.1, 100.2. Although the example of FIG. 1 shows two server nodes 100.1, 100.2, any number of one or more server nodes may be provided. The remaining nodes, designated as non-server nodes 100.3 through 100.$n$, perform input/output (I/O) operations on a storage device through a server node or over a local path. Nodes 100.1 through 100.$n$ are operably coupled to network 104 through one or more adapters, cables, switches, or any of various combinations thereof.

In preferred embodiments of the present invention, each node 100.$i$ is a processor node capable of communicating with other processor nodes using the publicly defined Transmission Control Protocol/Internet Protocol (TCP/IP) messaging protocol. While this protocol is referred to as an Internet Protocol, it should be noted that use of this term herein does not imply the existence of any Internet connection, nor does it imply dependence upon the Internet in any way. It is simply the name of a conveniently used, well characterized communication protocol suitable for use within a connected network of data processing nodes.

Each node 100.$i$ may include one or more Central Processing Units (CPUs), some or all of which share memory with one another. Each node 100.$i$ may be connected locally to a non-volatile storage device such as a Direct Access Storage Device (DASD) unit or other similar storage device 200.$i$, where i is an integer greater than or equal to 2, but less than or equal to n. Storage device 200.$i$ typically comprises a rotating magnetic disk storage unit, sometimes referred to as a disk drive. However, the scope of the present invention includes any nonvolatile storage mechanism capable of holding data files. The number n of nodes 100.$i$ is not critical. Furthermore, not everything operably coupled to network 104 has to be a data processing node. A plurality of DASD storage devices 300.1 through 300.$m$ are connected to network 104 using, for example, a network adapter 300 for maintaining communication between DASD storage devices 300.1 to 300.$m$ and network 104.

A file system is a computer program that allows other application programs to store and retrieve data on media such as disk drives. A file is a named object of arbitrary size. The file system allows application programs to create files, to give them names, to store data into them (or write), to read data from them, to delete data elements from them, and to perform other operations on them. A file structure is the organization of data on the disk drives.

A shared disk file system is one in which a file structure residing on one or more disks is accessed by multiple file systems running on separate computers (or nodes) which may include one or more data processing units. A shared disk file system is structured to allow data computations that use the file structure to be broken up into multiple pieces that can be run in parallel on multiple nodes.

In addition to the file data itself, the file structure also contains a mapping directory, file metadata, an allocation map, and a superblock. The mapping directory maps a file name into one or more corresponding files. File metadata (i-nodes and indirect blocks) contains information about files such as the location of the file data on disk (i.e., which disk blocks hold the file data). The allocation map records which disk blocks are currently in use for storing metadata and file data. The superblock contains overall information about the file structure (e.g., the locations of the directory, allocation map, and other metadata structures).

The file system employed by the present invention may, but need not, be the General Parallel File System (GPFS) as marketed and sold by the assignee herein. GPFS allows shared access to files that span multiple disk drives on multiple processor nodes, enhancing performance by allowing data to be accessed over multiple computers at once. Most existing file systems are designed for a single server environment, and adding more file servers does not improve performance. GPFS provides higher input/output (I/O) performance by striping blocks of data from individual files over multiple disks, and reading and writing these blocks in parallel. Other feature sets provided by GPFS include high availability, support for heterogenous clusters, disaster recovery, and security.

From time to time, an adapter, cable, switch, or other hardware element may fail while a non-server node is accessing the disk drive through a local path. This failure may cause one or more I/O operations to fail, ultimately resulting in file system unmount due to lost access to the disk drive. Accordingly, a user could be deprived of access to important data unless a suitable technique is utilized to provide file system availability.

Figure 2:
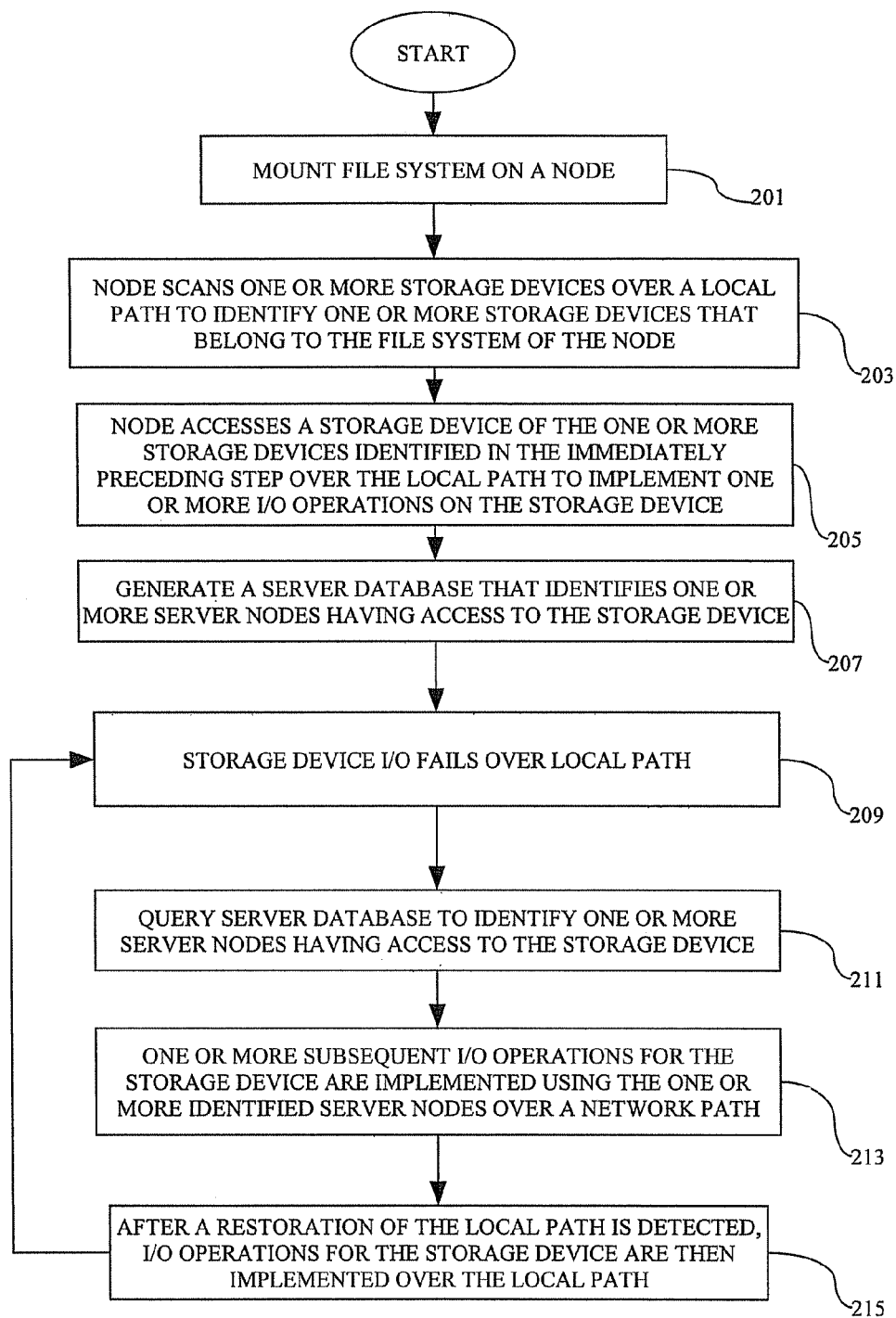
FIG. 2 is a flowchart setting forth an illustrative operational sequence for providing file system availability during local path failure of a non-server node.

FIG. 2 is a flowchart setting forth an illustrative operational sequence for providing file system availability during local path failure of a non-server node. The procedure commences at block 201 where a file system is mounted on a node such as node 100.3 (FIG. 1). At block 203 (FIG. 2), the node scans one or more storage devices (such as 200.3 (FIG. 1)) over a local path to identify one or more storage devices that belong to the file system of the node. This step may be performed by identifying a unique identification written to the storage device upon creation of the file system. Next (FIG. 2, block 205), the node accesses the storage device 200.3 (FIG. 1) identified in the immediately preceding step over the local path to implement one or more I/O operations on the storage device. A server database is generated that identifies one or more server nodes 100.1, 100.2 (FIG. 1) having access to the storage device (FIG. 2, block 207). This server database could, but need not, be stored at storage device 200.3, or at node 100.3, or at another location in the system of FIG. 1.

At some point, storage device I/O over the local path fails (FIG. 2, block 209). This failure may occur due to a broken or malfunctioning cable, switch, or adapter. Upon failure of an I/O operation over the local path, the server database is queried to identify one or more server nodes 100.1, 100.2 having access to the storage device (FIG. 2, block 211). At block 213, one or more subsequent I/O operations for storage device 200.3 (FIG. 1) are implemented using the one or more identified server nodes 100.1 or 100.2.

Optionally, if I/O fails when a first identified server node 100.1 is employed, then I/O operations using a second identified server node 100.2 are attempted, and so on, until a successful I/O operation is implemented using a server node, or until I/O operations fail for all identified server nodes having access to the storage device. Optionally, a notification is sent to an administrator when an I/O operation over the local path fails, or when an I/O operation using a server node over a network path commences, or both.

After a restoration of the local path is detected (FIG. 2, block 215), I/O operations for storage device 200.3 (FIG. 1) are then implemented over the local path. For example, upon receiving notification that I/O over the local path has failed, or upon receiving notification that I/O using a server node over a network path has commenced, a system administrator may perform diagnostic tests to identify any failed components or connections in the system of FIG. 1. Appropriate repairs or corrections to the system are made. The administrator may periodically or repeatedly perform a test to ascertain whether or not the local path has been restored. This test may be performed, for example, by determining whether or not the local path is configurable. Alternatively or additionally, an administrative option can be provided whereby the administrator informs GPFS that the local path has been restored.

As stated previously, implementation of I/O on the local path is resumed after the local path has been restored. Accordingly, this will result in the file system remaining available throughout any adapter, switch, cable or physical connection failure, thereby assuring that all applications running over GPFS are available to all users at all times. When the local path is not available, performance may be slightly less efficient due to the necessity of operating over a network path. However, once the failed component is fixed or the failed connection is restored, the full performance of the system is restored, all the while providing consistent availability. This functionality is performed without affecting other storage devices.

The foregoing exemplary embodiments may be provided in the form of computer-implemented processes and apparatuses for practicing those processes. The exemplary embodiments can also be provided in the form of computer program code containing instructions embodied in tangible media, such as floppy diskettes, CD ROMs, hard drives, or any other computer-readable storage medium, wherein, when the computer program code is loaded into and executed by a computer (such as, for example, one or more processing nodes 100.$i$ of FIG. 1), the computer becomes an apparatus for practicing the exemplary embodiments. The exemplary embodiments can also be provided in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the exemplary embodiments. When implemented on a general-purpose microprocessor, the computer program code segments execute specific microprocessor machine instructions. The computer program code could be implemented using electronic logic circuits or a microchip.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for providing file system availability during local path failure of a non-server node, the method including:
    mounting a file system on a non-server node;
    scanning one or more storage devices over a local path to identify a storage device that belongs to the file system of the non-server node by identifying a unique identification written to the storage device upon creation of the file system;
    accessing the storage device via the non-server node;
    generating a server database of one or more server nodes having access to the storage device of the file system;
    accessing the storage device using a non-server node over a local path to implement one or more input/output (I/O) operations;
    upon failure of an I/O operation over the local path, querying the server database to identify one or more server nodes having access to the storage device;
    implementing one or more subsequent I/O operations for the storage device using the one or more identified server nodes;
    transmitting a notification to an administrator when an I/O operation over the local path fails; and
    transmitting a notification to the administrator when an I/O operation using a server node over a network path commences.

2. The method of claim 1 further comprising detecting a restoration of the local path by which the non-server node accesses the storage device.

3. The method of claim 2 further comprising resuming I/O operations for the storage device over the local path after detecting the restoration of the local path.

4. A computer program product comprising a storage medium readable by a processing circuit and storing instructions for execution by the processing circuit for facilitating a method for providing file system availability during local path failure of a non-server node, the method comprising:
    mounting a file system on a non-server node;
    scanning one or more storage devices over a local path to identify a storage device that belongs to the file system of the non-server node by identifying a unique identification written to the storage device upon creation of the file system;
    accessing the storage device via the non-server node;
    generating a server database of one or more server nodes having access to the storage device of the file system;
    accessing the storage device using a non-server node over a local path to implement one or more input/output (I/O) operations;
    upon failure of an I/O operation over the local path, querying the server database to identify one or more server nodes having access to the storage device;
    implementing one or more subsequent I/O operations for the storage device using the one or more identified server nodes;
    transmitting a notification to an administrator when an I/O operation over the local path fails; and
    transmitting a notification to the administrator when an I/O operation using a server node over a network path commences.

5. The computer program product of claim 4 further comprising instructions for detecting a restoration of the local path by which the non-server node accesses the storage device.

6. The computer program product of claim 5 further comprising instructions for resuming I/O operations for the storage device over the local path after detecting the restoration of the local path.

7. A system for providing file system availability during local path failure of a non-server node, the system including:
    a storage device for a file system;
    a non-server node operably coupled to the storage device through a local path over which one or more input/output (I/O) operations for the storage device may be performed, the non-server node having a file system mounted thereon, the non-server node scanning one or more storage devices over a local path to identify a storage device that belongs to the file system of the non-server node by identifying a unique identification written to the storage device upon creation of the file system, the non-server node accessing the storage device;
    at least one server node operably coupled to the storage device through a network over which one or more I/O operations for the storage device may be performed;
    a database storage mechanism for storing a server database of one or more server nodes having access to the storage device; and
    a processing mechanism, responsive to an I/O failure of the local path, for querying the server database to identify one or more server nodes having access to the storage device and implementing one or more subsequent I/O operations for the storage device using the one or more identified server nodes over the network;
    the processing mechanism transmitting a notification to an administrator when an I/O operation over the local path fails and transmitting a notification to the administrator when an I/O operation using a server node over a network path commences.

8. The system of claim 7 wherein the database storage mechanism is implemented by the storage device.

9. The system of claim 7 wherein the processing mechanism is implemented by the non-server node.

10. The system of claim 7 wherein the processing mechanism is implemented by the at least one server node.

11. The system of claim 7 wherein the processing mechanism is capable of detecting a restoration of the local path by which the non-server node accesses the storage device.

12. The system of claim 7 wherein the processing mechanism initiates a resumption of I/O operations for the storage device over the local path after detecting restoration of the local path.

* * * * *